United States Patent Office 3,268,045
Patented August 23, 1966

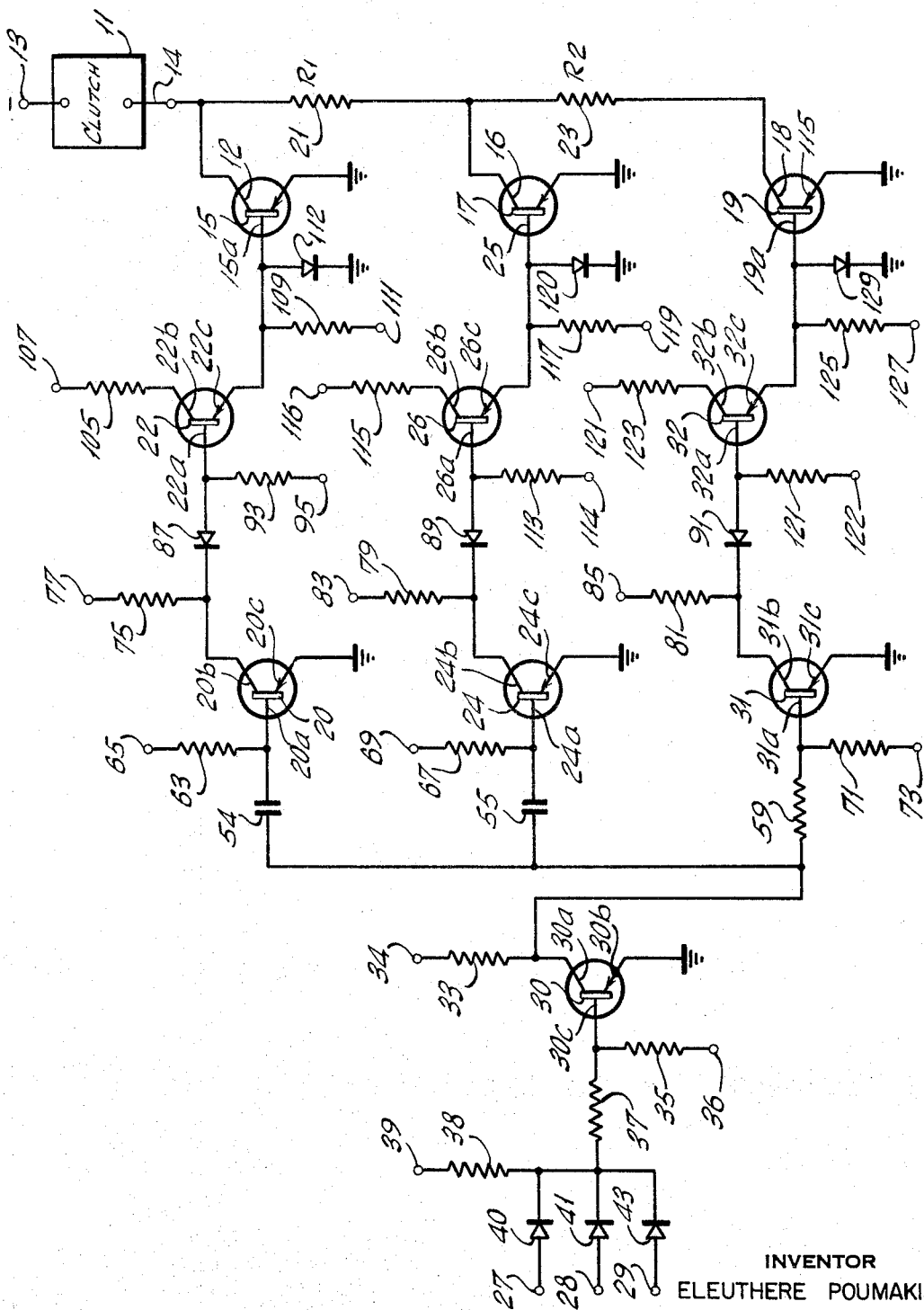

3,268,045
CLUTCH DRIVE CIRCUIT
Eleuthere Poumakis, East Islip, N.Y., assignor to Potter Instrument Company, Inc., Plainview, N.Y., a corporation of New York
Filed Apr. 13, 1964, Ser. No. 359,320
6 Claims. (Cl. 192—84)

This invention, generally, relates to electrically actuated clutches and, more particularly, to a clutch with an improved circuit and a method for controlling the application of power to the clutch.

It is desirable that a clutch for driving the capstan of a tape transport engage and bring the capstan up to operating speed as quickly as possible. The major factor which controls the speed at which an electrically actuated clutch engages is the rate at which the current applied to the clutch increases. Because the coil of an electrically actuated clutch is an inductive load, the current flow through the clutch does not increase simultaneously with the voltage applied to the clutch but lags behind it.

Nevertheless, the rate that the current applied to the clutch builds up can be increased by increasing the voltage applied to the clutch. However, the steady state current applied to the clutch will increase proportionally with the higher voltage and a high steady state current flowing through the clutch is undesirable because of overheating problems and the problems it would create when the clutch is disengaged. When the current flow through the clutch is interrupted to disengage the clutch, an electromotive force is produced in the coil of the clutch tending to maintain the current flowing. The magnitude of this electromotive force depends upon the magnitude of the current flowing through the clutch when it is interrupted. For this reason, it is desirable to have a low, steady state current flowing through the clutch after the clutch is engaged.

A drive circuit of the present invention automatically controls the voltage applied to the clutch so as to initially apply a high voltage to the clutch and, then, reduce the voltage automatically after the current through the clutch has built up and the clutch has engaged. This is accomplished in accordance with the present invention by means of three transistors each of which is operable to supply current to the clutch.

When a signal is applied to the drive circuit calling for the clutch to engage, initially all three transistors will conduct, and a high voltage will be applied across the clutch causing the current to build up through the clutch rapidly. A time delay circuit automatically cuts off the flow of current through one of the transistors after a time interval, which is selected to expire at the time the current through the clutch reaches a predetermined value. When the current flow through the first transistor is cut off, the voltage applied across the clutch will be reduced, but the current flowing through the clutch will remain substantially at the predetermined value.

A second time delay circuit then will cause the current flow through a second one of the transistors to be cut off after a second time interval, which is selected to expire immediately after the clutch has engaged completely and the driven member of the clutch has come up to the speed of the driving member of the clutch. The current and voltage applied to the clutch then will be reduced to lower values.

When it is desired to disengage the clutch, the current flow through the third transistor is interrupted, thus interrupting the current flowing through the clutch. By this arrangement, the circuit achieves the advantages of having a rapidly increasing current initially applied to the clutch and, at the same time, achieves the advantages of a low steady state current applied to the clutch after the clutch has fully engaged.

Accordingly, an object of the present invention is to provide an improved control circuit for controlling the voltage and the current applied to an electrically actuated clutch.

Another object of the invention is to reduce the time it takes an electrically actuated clutch to engage.

A further object of the invention is to reduce the time it takes an electrically actuated clutch to engage and, at the same time, reduce the steady state current applied to the clutch after the clutch has engaged.

A still further object of the present invention is to provide a clutch drive circuit which automatically applies a higher current to the clutch while the clutch is engaging and which reduces this current to a lower value after the clutch has fully engaged.

Further objects and advantages of the present invention will become more readily apparent as the following detailed description of the invention unfolds and when taken in conjunction with the single figure of the drawings, which schematically illustrates a drive circuit in accordance with the present invention.

In the drawings, an electrically actuated clutch is designated generally by the reference number 11. One side of the coil of the clutch 11 is connected to the negative side of a 90 volt direct current (D.-C.) electrical source connected to a terminal 13, and the other side of the coil of the clutch 11 is connected to the collectors of three PNP transistors 15, 17 and 19. The collector 12 of the transistor 15 is connected directly to the clutch 11 through a lead 14, the collector 16 of the transistor 17 is connected to the clutch 11 through a 70 ohm resistor 21, and the collector 18 of the transistor 19 is connected to the clutch 11 through the resistor 21 and a 375 ohm resistor 23 connected in series.

When the clutch 11 is disengaged, the current flow through all three of the transistors 15, 17 and 19 will be cut off. When a signal is applied to the drive circuit calling for the clutch to engage, the transistors 15, 17 and 19 will saturate, and the full 90 volts connected to the terminal 13 will be applied across the clutch 11. After a predetermined time interval, when the current through the clutch 11 has risen to a predetermined value, the current flow through the transistor 15 will be cut off. The predetermined current, now, will continue to flow through the clutch 11 supplied by the saturated transistor 17 through the resistor 21. However, because of the voltage drop across the resistor 21, the voltage applied across the clutch 11 will be reduced below the 90 volt value. This voltage is selected so as to maintain the current flow through the clutch 11 at the value it reached at the time the transistor 15 was cut off.

After a second predetermined time interval, which is selected to expire immediately after the clutch 11 has engaged fully and the driven member of the clutch has come up to the speed of the driving member, the transistor 17 will be cut off. Current will continue to be applied to the clutch 11, flowing through the resistors 21 and 23 and through the saturated transistor 19. The voltage applied across the clutch, now, will be reduced further due to the voltage drop across the resistor 23, and as a result the current flow through the clutch 11, the current will drop to a lower steady state value, just large enough to maintain the clutch 11 firmly engaged.

The predetermined time interval that the transistor 15 conducts is determined by a time delay circuit which includes a PNP transistor 20. This time delay circuit, in response to an input signal calling for the clutch to engage, produces an output pulse, which is amplified by an emitter follower circuit which includes a PNP transistor 22, and then the output pulse is applied to the base 15a of the transistor 15. This pulse causes the transistor 15 to saturate, and the transistor 15 remains saturated until the end of the pulse when the current flow through the transistor 15 is cut off. Thus, the width of the pulse produced by the time delay circuit including the transistor 20 determines the length of the time interval during which the transistor 15 conducts and during which the full 90 volts is applied across the clutch 11.

The predetermined time interval that the transistor 17 conducts is determined by a time delay circuit which includes a PNP transistor 24. This time delay circuit in response to the input signal calling for the clutch 11 to engage produces an output pulse of a greater pulse width than that produced by the time delay circuit of the transistor 20. The pulse produced by the time delay circuit of the transistor 24 is amplified by an emitter follower circuit which includes a PNP transistor 26 and is applied to the base 25 of the transistor 17, causing the transistor 17 to saturate for the duration of the applied pulse.

Thus, the width of the pulse produced by the time delay circuit which includes transistor 24 determines the time interval that the transistor 17 conducts. The intermediate voltage, which is determined by the resistor 21 and which maintains the desired current flowing through the clutch 11 until the driven member of the clutch 11 comes up to the speed of the driving member, will be applied to the clutch 11 for the time interval between the end of the pulse produced by the time delay circuit of the transistor 20, and the end of the pulse produced by the time delay circuit of the transistor 24.

The input signal to the clutch drive circuit of the present invention is applied by means of three terminals 27, 28 and 29. When the clutch 11 is disengaged, at least one of the terminals 27, 28 and 29 will be grounded. When the clutch is engaged, none of the terminals 27, 28 and 29 will be grounded. Thus, the input signal calling for the clutch to engage is the removal of the ground from all of the input terminals 27, 28 and 29, and the signal calling for the clutch to disengage is the grounding of at least one of the input terminals 27, 28 and 29.

When the clutch is disengaged and the ground is removed from all of the input terminals 27, 28 and 29 thus calling for the clutch to engage, a PNP transistor 30 in response to this input signal will produce a positive going step function voltage at its collector 30a, which step function voltage is applied to the time delay circuits which include the transistors 20 and 24. In response to this step function voltage, the time delay circuits produce their output pulses of predetermined pulse widths.

The positive going step function voltage also is inverted by a PNP transistor 31 and is amplified by an emitter follower circuit which includes a PNP transistor 32 and, then, is applied to the base 19a of the transistor 19. The transistor 19 will saturate and will remain saturated for as long as no ground is applied to one of the input terminals 27, 28 and 29.

When the clutch is engaged and one of the input terminals is grounded calling for the clutch 11 to disengage, the electrical potential at the collector 30a of the transistor 30 will drop to a negative value, and this change in potential will be inverted by the transistor 31, amplified by the emitter follower circuit of the transistor 32 and, then, will be applied to the base 19a of the transistor 19, which will be rendered nonconductive. Accordingly, current flow through the clutch 11 now is cut off, and the clutch disengages.

The emitter 30b of the transistor 30 is grounded, and the collector 30a of the transistor 30 is connected through a one kilohm resistor 33 to a minus 15 volt source applied at a terminal 34. The base 30c of the transistor 30 is connected through a 22 kilohm resistor 35 to a positive 15 volt source applied at a terminal 36, and the base 30c also is connected through the series circuit of a 4.7 kilohm resistor 37 and a 1 kilohm resistor 38 to a minus 15 volt source applied at a terminal 39.

The cathodes of three diodes 40, 41 and 43 are connected together at the junction between the resistors 37 and 38, and the anodes of the three diodes 40, 41 and 43 are connected to the input terminals 27, 28 and 29, respectively. The grounding of at least one of the input terminals 27, 28 and 29 will cause, by means of the voltage divider formed by the resistors 37 and 35, a positive potential to be applied at the base 30c of the transistor 30. When the ground is removed simultaneously from all three of the input terminals 27, 28 and 29, the potential applied to the base 30c of the transistor 30 will become negative as a result of the voltage divider action of the resistors 35, 37 and 38.

When a positive potential is applied to the base 30c of the transistor 30, it will be nonconductive. When the ground from all three of the input terminals 27, 28 and 29 is removed and a negative potential is applied at the base 30c of the transistor 30, it will conduct, and a sharp potential rise or positive going step function voltage will be produced at the collector 30a of the transistor 30. This step function will be transmitted through a 0.4 microfarad capacitor 54 to the base 20a of the transistor 20 and through a 0.4 microfarad capacitor 55 to the base 24a of the transistor 24 and through a 4.7 kilohm resistor 59 to the base 31a of the transistor 31.

The base 20a of the transistor 20 also is connected through a 3.9 kilohm resistor 63 to a minus 15 volt source applied at a terminal 65. The base 24a of the transistor 24 is connected through an 8.2 kilohm resistor 67 to a minus 15 volt source applied at a terminal 69, and the base 31a of the transistor 31 is connected through an 18 kilohm resistor 71 to a positive 15 volt source applied at a terminal 73. The emitters of the transistors 20, 24 and 31 are all connected to ground.

The collector 20b of the transistor 20 is connected through a 390 ohm resistor 75 to a minus 15 volt source applied at a terminal 77. The collectors 24b and 31b of the transistors 24 and 31, respectively, are each connected to a minus 15 volt source through 1 kilohm resistors 79 and 81, applied at terminals 83 and 85, respectively. With these connections, the transistors 20 and 24 will be normally saturated, and the transistor 31 will also be saturated when the transistor 30 is not conducting, as will be the case when at least one of the input terminals 27, 28 and 29 is grounded.

When it is desired for the clutch 11 to engage, the ground is removed from all three of the input terminals 27, 28 and 29, resulting in a negative potential being applied to the base 30c of the transistor 30. A sharp rise in voltage occurs at the collector 30a of the transistor 30, which sharp rise is transmitted to the bases 20a and 24a of the transistors 20 and 24, respectively, through the capacitors 54 and 55 and to the base 31a of the transistor 31 through the resistor 59. The conduction through all three of the transistors 20, 24 and 31 now will be cut off.

As a result, the voltage at the collectors of all three of the transistors 20, 24 and 31 will decrease sharply, and this sharp decrease in voltage will be transmitted from the collectors of the transistors 20, 24 and 31, through diodes 87, 89 and 91, respectively, to the bases of transistors 22, 26 and 32, respectively, The diodes 87, 89 and 91 have their cathodes connected to the collectors of the transistors 20, 24 and 31, respectively, and their anodes connected to the bases of the transistors 22, 26 and 32, respectively.

The base 22a of the transistor 22 is connected through a 750 ohm resistor 93 to a positive 15 volt source applied at a terminal 95. The collector 22b of the transistor 22 is connected through a 20 ohm resistor 105 to a minus 15 volt source applied at a terminal 107, and the emitter 22c of the transistor 22 is connected through a 75 ohm resistor 109 to a positive 15 volt source applied at a terminal 111. The emitter 22c of the transistor 22 is also directly connected to the base 15a of the transistor 15. The anode of a diode 112 is connected to the base 15a of the transistor 15 also, and the cathode of the diode 112 is connected to ground. Thus, the transistor 22 is connected as an emitter follower.

When the transistor 20 is in its normal saturated state, the collector 20b of the transistor 20 will be near ground potential. Current will flow from the terminal 95, through the resistor 93 and through the diode 87 to the junction between the collector 20b of the transistor 20 and the resistor 75. Because of the voltage drop across the diode 87, a small positive voltage will be applied to the base 22a of the transistor 22. Current will also flow from the terminal 111, through the resistor 109 and through the diode 112 to ground. As a result of the voltage drop across the diode 112, a small positive voltage will also be applied to the emitter of the transistor 22. The potential applied to the base 22a of the transistor 22 will be very nearly equal that applied to the emitter 22c of the transistor 22 so that current flow through the transistor 22 will be cut off when the transistor 20 is saturated.

The base 26a of the transistor 26 is connected through a 15 kilohm resistor 113 to a positive 15 volt source applied at a terminal 114. The collector 26b of the transistor 26 is connected through a 100 ohm resistor 115 to a minus 15 volt source applied at a terminal 116, and the emitter 26c of the transistor 26 is connected through a 300 ohm resistor 117 to a positive 15 volt source applied at a terminal 119. The emitter 26c of the transistor 26 is also directly connected to the base 25 of the transistor 17.

The anode of a diode 120 is connected to the base 25 of the transistor 17 also, and the cathode of the diode 120 is connected to ground. The transistor 26 is thus connected as an emitter follower, and the current flow through it will be cut off when the transistor 24 is saturated for the same reasons that the current flow through the transistor 22 is cut off when the transistor 20 is saturated.

The base 32a of the transistor 32 is connected through a 15 kilohm resistor 121 to a positive 15 volt source applied at a terminal 122. The collector 32b of the transistor 32 is connected through a 100 ohm resistor 123 to a minus 15 volt source applied at a terminal 124, and the emitter 32c of the transistor 32 is connected through a 300 ohm resistor 125 to a positive 15 volt source applied at a terminal 127. The emitter 32c of the transistor 32 is also connected directly to the base 19a of the transistor 19. The anode of a diode 129 is connected to the base 19a of the transistor 19 also, and the cathode of the diode 129 is grounded. Thus, the transistor 32 is connected as an emitter follower. When the transistor 31 is saturated, as it will be when at least one of the input terminals 27, 28 and 29 is grounded calling for the clutch 11 to be disengaged, current flow through the transistor 32 will be cut off for the same reasons that current flow through the transistor 22 is cut off when the transistor 20 is saturated.

When the positive going step function voltage, which is produced at the collector 30a of the transistor 30 in response to the input signal calling for the clutch 11 to engage, is applied to the base 20a of the transistor 20 and, as a result conduction through the transistor 20, is cut off resulting in a sharp decrease in the voltage at the collector 20b of the transistor 20, this sharp decrease will be transmitted through the diode 87 to the base 22a of the transistor 22 causing the transistor 22 to saturate. As a result, the voltage at the emitter 22c of the transistor 22 will also become negative, and this negative potential being applied to the base 15a of the transistor 15 will cause the transistor 15 to saturate. Thus, the transistor 15 will saturate in response to the positive going step function voltage produced at the collector 30a of the transistor 30 in response to the signal calling for the clutch 11 to engage.

Similarly, when the positive going step function voltage produced at the collector 30a of the transistor 30 is applied to the base 24a of the transistor 24 causing conduction through the transistor 24 to be cut off and the potential at the collector 24b of the transistor 24 to change sharply from near ground voltage to a negative value, this sharp decrease in voltage will be transmitted through the diode 89 to the base 26a of the transistor 26 causing the transistor 26 to saturate. As a result, the voltage at the emitter 26c of the transistor 26 will decrease to a negative value, which is applied to the base of the transistor 17 causing the transistor 17 to saturate. Thus, the transistor 17 saturates in response to the positive going step function voltage produced at the collector 30a of the transistor 30.

Similarly, when the transistor 31 stops conducting in response to the positive going step function voltage produced at the collector 30a of the transistor 30 and the potential at the collector 31a of the transistor 31 decreases sharply from near ground potential to a negative value, this sharp decrease in potential will be transmitted through the diode 91 to the base 32a of the transistor 32, causing the transistor 32 to saturate. As a result, a negative potential will be produced at the emitter 32c of the transistor 32, which negative potential is applied to the base 19a of the transistor 19 causing the transistor 19 to saturate. Thus, all three of the transistors 15, 17 and 19 become saturated in response to the input signal calling for the clutch 11 to engage.

After the transistor 20 is cut off in response to the applied positive going step function voltage from the collector 30a of the transistor 30, the capacitor 54 will begin to charge through the resistor 63, and the potential at the base 20a of the transistor 20 will become more negative until the transistor 20 will again begin to conduct and then will saturate. When this happens, the potential at the collector 20b of the transistor 20 will rise again to a valve near ground, and this rise in potential will be transmitted to the base 22a of the transistor 22 through the diode 87 causing the current flow through the transistor 22 to again but cut off.

When the current flows through the transistor 22 is cut off, the potential at the emitter 22c of the transistor 22 and at the base 15a of the transistor 15 will rise again to a positive value causing the current flow through the transistor 15 to be cut off again. Thus, a predetermined time interval after the input signal calling for the clutch 11 to engage the current flow through the transistor 15 will be cut off and the potential applied across the clutch 11 will be reduced accordingly. This time interval is determined by how long it takes the transistor 20 to saturate, which time is determined in turn by the RC time constant of the capacitor 54 and the resistor 63. This time constant is selected so that the transistor 15 will cut off when the current flow through the clutch 11 reaches the desired peak value.

When the ground has been removed from all of the input terminals 27, 28 and 29, thus calling for the clutch 11 to engage and the resulting positive going step function has been applied to the base 24a of the transistor 24, the capacitor 55 will begin to charge through the resistor 67 and, as a result the potential at the base 24a of the transistor 24, will change in the negative direction until the transistor 24 again conducts and saturates. When this action occurs, the potential at the collector 24c of the transistor 24 will rise back again to near ground potential, and this rise in potential will be transmitted through the diode 89 to the base 26a of the transistor 26 causing the transistor 26 to be cut off again; whereupon the potential at the emitter 26c of the transistor 26 and at the base 25 of the transistor 17 will become positive again causing the transistor 17 to be cut off.

When the conduction through the transistor 17 is cut off, the potential across the clutch 11 will drop to the low value determined by the resistors 21 and 23, and the current flow through the clutch 11 will also drop to the corresponding predetermined low value. Thus, the transistor 17 is rendered nonconductive a predetermined time interval after the input signal is applied calling for the clutch 11 to engage. This time interval is determined by the RC time constant of the capacitor 55 and the resistor 67 and is selected to be longer than the time interval determined by the RC time constant of the capacitor 54 and the resistor 63 and to expire immediately after the clutch 11 completely engages and the the driven member of the clutch comes up to the speed of the driving member.

Thus, the transistor 17 will become nonconductive, and the potential applied to the clutch 11 will drop down to the low value determined by the resistors 21 and 23 immediately after the clutch 11 completely engages. This relatively low potential and the corresponding steady state current flow through the clutch 11 will be maintained until a signal is applied to the circuit calling for the clutch 11 to disengage. This signal will be in the form of grounding one of the input terminals 27, 28 and 29.

When one of the input terminals 27, 28 and 29 is grounded, the potential at the base of the transistor 30 will become positive, and the current flow through the transistor 30 will be cut off. As a result, the potential at the collector 30b of the transistor 30 will become sharply negative. This drop in potential will be transmitted through the resistor 59 to the base 31a of the transistor 31 causing the transistor 31 to saturate, whereupon the potential at the collector 31c of the transistor 31 will rise from a negative value to a value near ground. This rise in potential will be transmitted through the diode 91 to the base 32a of the transistor 32 rendering the transistor 32 nonconductive The resulting potential at the emitter 32c of the transistor 32 and at the base 19a of the transistor 19 will rise, whereupon the current flow through the transistor 19 will be cut off. This action will cut off the current flow through the clutch 11 and will cause it to disengage. Then, after the capacitors 54 and 55 have had time to recharge, the cycle can be repeated.

Thus, the described circuit first applied the full 90 volts to the clutch 11 in response to an applied signal calling for the clutch 11 to engage. Then after a predetermined time delay which is set to expire when the current through the clutch 11 reaches a predetermined desired peak value, the potential across the clutch 11 is dropped automatically to lower value which is selected to maintain this peak current. After another predetermined time delay which is selected to expire immediately after the clutch 11 has engaged completely and the driven member of the clutch has come up to the speed of the driving member, the potential across the clutch 11 is dropped automatically to a still lower value, and the current flow through the clutch 11 will also drop. This third and lowest potential is selected so that the steady state current which flows through the clutch 11 in response to this potential will be just sufficient to maintain the clutch 11 firmly engaged. In this manner, the advantages of having a fast rising current when the clutch is first energized and having a low steady state current are achieved in the same clutch.

The above description is of a preferred embodiment of the invention, and many modifications may be made thereto without departing from the spirit and scope of the invention, which is defined in the appended claims.

What is claimed is:

1. In combination,
an electrically actuated clutch which engages in response to current flowing therethrough,
means operable in response to an input signal to apply a first voltage across said clutch for a predetermined time interval after the time said input signal is applied,
means operable in response to said input signal to apply across said clutch a second voltage lower than said first voltage for a predetermined time interval immediately following said first time interval, and
means operable in response to said input signal to apply across said clutch a third voltage lower than said second voltage after the end of said second time interval.

2. The combination recited in claim 1 wherein said second voltage has a magnitude sufficient to maintain the current flow through said clutch at the value that it reached at the end of said first interval.

3. The combination as recited in claim 1 wherein the predetermined time interval that said second voltage is applied across said clutch is selected to terminate immediately after said clutch has completely engaged and the driven member of said clutch has reached the speed of the driving member of said clutch.

4. In combination,
an electrically actuated clutch which engages in response to a direct current flowing therethrough, and
means operable in response to an input signal for applying across said clutch a direct current voltage having a first predetermined value for a predetermined time interval after the time said input signal is applied, then dropping to a second predetermined value lower than said first predetermined value and remaining at said second value for a second predetermined time interval following said first time interval, and then dropping to a third predetermined value at the end of said second time interval.

5. In combination,
an electric clutch which engages in response to a direct current flowing therethrough,
a source of direct current voltage,
a first transistor,
a second transistor,
a third transistor,
circuit means to connect said first transistor, said clutch and said source of direct current voltage in a first circuit to connect said second transistor, said clutch and said source direct current voltage in a second circuit, and to connect said third transistor, said clutch and said source direct current voltage in a third circuit, said second circuit containing more resistance than said first circuit and said third circuit containing more resistance than said second circuit,
means rendering said first transistor normally nonconductive and operable in response to an input signal to cause said first transistor to conduct for a predetermined time interval after the time said input signal is applied,
means to render said second transistor normally nonconductive and operable in response to said input signal to render said second transistor conductive for a second predetermined time interval after the time said input signal is applied, said second predetermined time interval being longer than said first predetermined time interval, and
means operable in response to the absence of said input signal to render said third transistor nonconductive and operable in response to the presence of said input signal to render said third transistor conductive.

6. In combination,
an electrically actuated clutch which engages in response to current flowing therethrough,
a source of voltage,
first switch means having a conductive and a nonconductive state,
second switch means having a conductive and a nonconductive state,
third switch means having a conductive and a nonconductive state,
circuit means connecting said first switch means, said clutch and said voltage source in a first circuit, connecting said second switch means, said clutch and said voltage source in a second circuit, and connecting said third switch means, said clutch and said voltage source in a third circuit, said second circuit having more resistance than said first circuit and said third circuit having more resistance than said second circuit, means maintaining said first switch means normally in its nonconductive state and operable in response to an input signal to place said first switch means in its conductive state for a first predetermined time interval after the time said input signal is applied, means to maintain said second switch means normally in its nonconductive state and operable in response to said input signal to place said second switch means in its conductive state for a second predetermined time interval after the time said input signal is applied, said second time interval being longer than said first time interval, and means operable in response to the absence of said input signal to maintain said third switch means in its nonconductive state and operable in response to the presence of said input signal to maintain said third switch means in its conductive state.

References Cited by the Examiner

UNITED STATES PATENTS

| | | | |
|---|---|---|---|
| 1,671,057 | 5/1928 | Brainerd | 192—84 |
| 2,395,772 | 2/1946 | Winther | 192—84 |
| 2,788,872 | 4/1957 | Winther | 192—84 |
| 2,933,625 | 4/1960 | Townsend et al. | 307—88.5 |
| 2,945,990 | 7/1960 | Hipple | 317—123 |
| 3,116,441 | 12/1963 | Gieffers | 317—154 X |
| 3,189,150 | 6/1965 | Chapman | 192—84 |
| 3,193,697 | 7/1965 | Cogar et al. | 307—88.5 |

DAVID J. WILLIAMOWSKY, *Primary Examiner.*

DON A. WAITE, *Examiner.*

A. T. McKEON, *Assistant Examiner.*